US011157500B2

(12) United States Patent
Seong et al.

(10) Patent No.: US 11,157,500 B2
(45) Date of Patent: Oct. 26, 2021

(54) DETERMINATION OF QUERY OPERATOR EXECUTION LOCATION

(71) Applicant: SAP SE, Walldorf (DE)

(72) Inventors: JunGyoung Seong, Seoul (KR); Jane Jung Lee, Seoul (KR); Jung Kook Lee, Seoul (KR)

(73) Assignee: SAP SE, Walldorf (DE)

( * ) Notice: Subject to any disclaimer, the term of this patent is extended or adjusted under 35 U.S.C. 154(b) by 282 days.

(21) Appl. No.: 16/373,867

(22) Filed: Apr. 3, 2019

(65) Prior Publication Data

US 2020/0320076 A1    Oct. 8, 2020

(51) Int. Cl.
*G06F 7/00* (2006.01)
*G06F 16/00* (2019.01)
*G06F 16/2453* (2019.01)
*G06F 16/22* (2019.01)

(52) U.S. Cl.
CPC .... *G06F 16/24545* (2019.01); *G06F 16/2282* (2019.01); *G06F 16/24537* (2019.01)

(58) Field of Classification Search
None
See application file for complete search history.

(56) References Cited

U.S. PATENT DOCUMENTS

| | | | |
|---|---|---|---|
| 9,183,234 B2 * | 11/2015 | Mueller | G06F 16/00 |
| 2016/0350375 A1 * | 12/2016 | Das | G06F 16/24542 |
| 2017/0132276 A1 * | 5/2017 | Saurabh | G06F 16/24534 |
| 2018/0081946 A1 * | 3/2018 | Bondalapati | G06F 16/24556 |
| 2019/0087457 A1 * | 3/2019 | Bellamkonda | G06F 16/24553 |

* cited by examiner

*Primary Examiner* — Tuan A Pham
(74) *Attorney, Agent, or Firm* — Buckley, Maschoff & Talwalkar LLC

(57) ABSTRACT

A system includes determination of a first partition-wise operation on a first database table partition of a first table located at a first server node and a first database table partition of a second table located at a second server node, determination of a first cost to execute the first partition-wise operation on the first server node, and a second cost to execute the first partition-wise operation on the second server node, determination of a second partition-wise operation on a result of the first partition-wise operation, determination of a third cost to execute the second partition-wise operation on the first server node based on the first cost and the second cost, and a fourth cost to execute the second partition-wise operation on the second server node based on the first cost and the second cost, determination of one of the first server node and the second server node to execute the second partition-wise operation based on the third cost and the fourth cost, and determination of one of the first server node and the second server node to execute the first partition-wise operation based on the third cost and the fourth cost.

18 Claims, 7 Drawing Sheets

DETERMINATION OF QUERY OPERATOR EXECUTION LOCATION

BACKGROUND

Database systems may provide distributed data storage and distributed query execution. For example, a database system may include one or more database nodes, each of which stores unique data and is capable of executing query operators. A distributed architecture may therefore require the execution of queries on data which spans multiple database nodes.

Techniques are needed to efficiently determine database nodes on which to execute particular query operators of a given query. Such techniques should consider the locations of the data being queried, and should be compatible with partitioned tables and with queries including multi-level nested query operators.

DETAILED DESCRIPTION

The following description is provided to enable any person in the art to make and use the described embodiments and sets forth the best mode contemplated for carrying out some embodiments. Various modifications, however, will be readily-apparent to those in the art.

Some embodiments relate to determination, based on partition location and data transfer costs, of database nodes on which to execute particular query operators of a given query. For example, costs to execute each of one or more first partition-wise operations on each of two or more server nodes are determined. Then, costs to execute one or more second partition-wise operations on each of two or more server nodes are determined based on the determined costs to execute each of one or more first partition-wise operations on each of two or more server nodes. The determined costs are then used as described below to determine the server nodes on which to execute each partition-wise operation.

Figure 1:
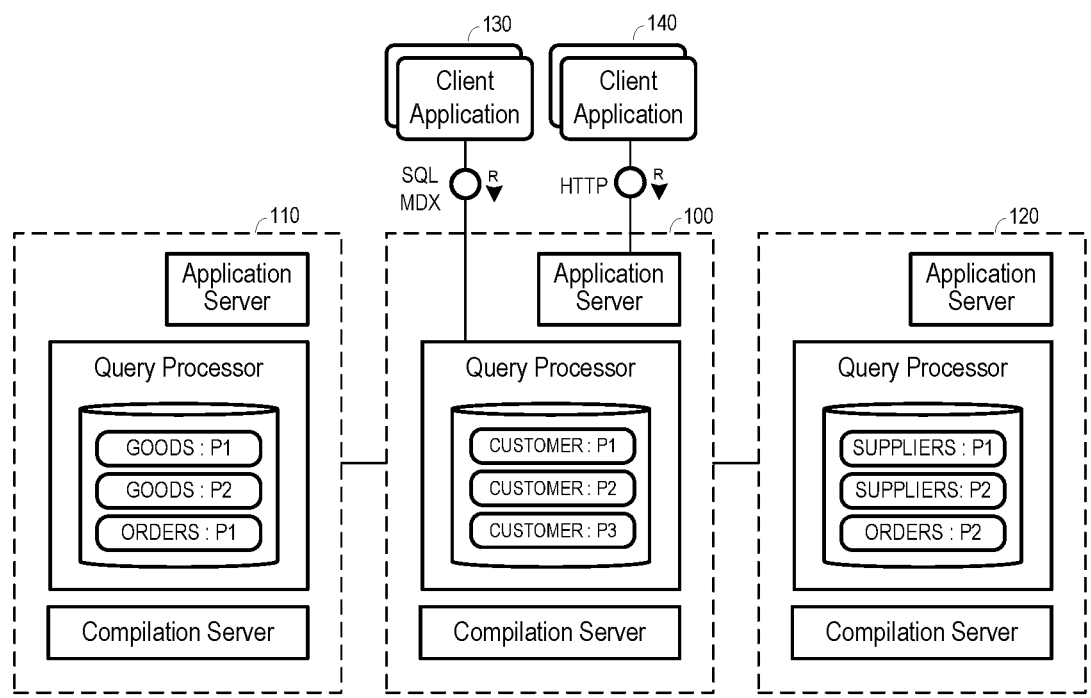
FIG. 1 is a block diagram of a distributed database system according to some embodiments.

FIG. 1 is a block diagram of a distributed database architecture according to some embodiments. Embodiments are not limited to the FIG. 1 architecture.

FIG. 1 illustrates server nodes 100, 110 and 120. Generally, one of nodes 100, 110 and 120 receives a query from client applications 130 and 140 and returns results thereto based on data stored within nodes 100, 110 and 120. Although FIG. 1 illustrates node 100 receiving requests from client applications 130 and 140, client applications 130 and 140 may send requests to any of server nodes 100, 110 and 120 according to some embodiments. If the receiving server node does not store all of the data involved in the request, execution of some operations may be delegated to other server nodes. Server node 100 may determine server nodes for execution of various query operations as will be described in detail below.

Each of nodes 100, 110 and 120 executes program code to provide an application server, a query processor and a compilation server. The application server provides services for executing server applications. For example, Web applications executing on an application server may receive HyperText Transfer Protocol (HTTP) requests from client applications 140 as shown in FIG. 1.

A query processor contains the actual stored data and engines for processing the data. Server node 100 An execution engine of a query processor may provide one or more physical operators corresponding to one or more logical operators. The physical operators may comprise processor-executable program code which is executable to perform corresponding logical operations (e.g., JOIN, SELECT, etc.) on stored data. The set of logical operators for which an execution engine includes one or more physical operators might not be identical across execution engines. Moreover, a physical operator provided by one execution engine and corresponding to a logical operator may differ from a physical operator provided by another execution engine and corresponding to the same logical operator. The data format output by various physical operators of various execution engines (even those corresponding to a same logical operator) may differ as well.

The query processor is responsible for processing Structured Query Language (SQL) and Multi-Dimensional eXpression (MDX) statements and may receive such statements directly from client applications 130. The query processor may also include a statistics server for use in determining query execution plans. A compilation server is also provided to compile stored procedures and programs. According to some embodiments, a compilation server determines locations for execution of query operations as described below.

Each of server nodes 100, 110 and 120 performs administrative and management functions. Such functions may include snapshot and backup management, indexing, optimization, garbage collection, and/or any other database functions that are or become known.

In some embodiments, the data of server nodes 100, 110 and 120 may comprise one or more of conventional tabular data, row-based data, column-based data, and object-based data. Moreover, the data may be indexed and/or selectively replicated in an index to allow fast searching and retrieval thereof. Server nodes 100, 110 and 120 may support multi-tenancy to separately support multiple unrelated clients by providing multiple logical database systems which are programmatically isolated from one another.

One or more of server nodes 100, 110 and 120 may implement an "in-memory" database, in which a full database stored in volatile (e.g., non-disk-based) memory (e.g., Random Access Memory). The full database may be persisted in and/or backed up to fixed disks (not shown). Embodiments are not limited to an in-memory implementation. For example, data may be stored in Random Access Memory (e.g., cache memory for storing recently-used data) and one or more fixed disks (e.g., persistent memory for storing their respective portions of the full database).

Figure 2:
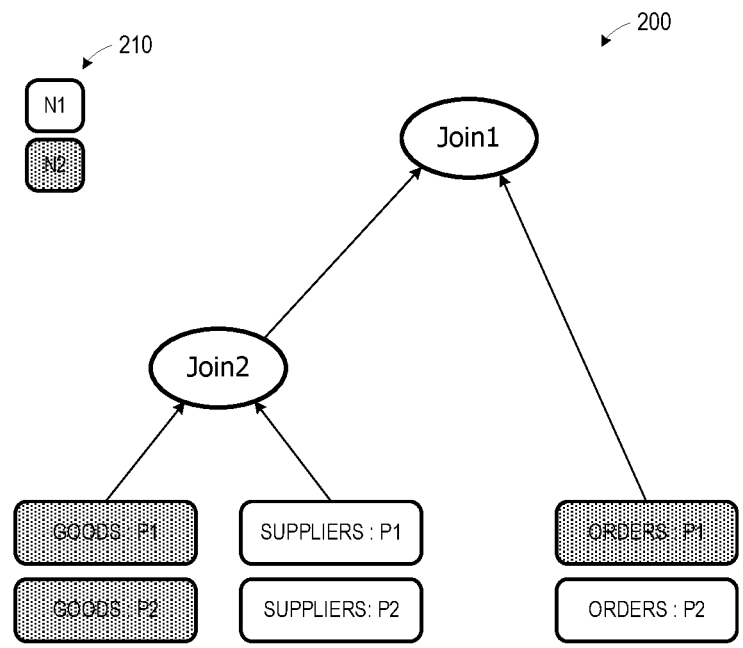
FIG. 2 illustrates a query on partitioned and distributed database table data according to some embodiments.

To describe some embodiments by way of an example, FIG. 2 is a diagram of a query operator tree 200 representing a received query. According to some embodiments, the query represented by tree 200 is received by server node 100. The received query requires a join (i.e., Join2) of a Goods table and a Suppliers table, and a second join (i.e., Join1) of the result of the first join and an Orders table. Each of the Goods, Suppliers and Orders tables include two partitions. Tree 200 is color-coded according to legend 210 to indicate the location of the partitions. Both partitions of the Suppliers table are stored on server node N1 (e.g., server node 120 of FIG. 1), both partitions of the Goods table are stored on server node N2 (e.g., server node 110 of FIG. 1), partition 1 of the Orders table is stored on server node N2 and partition 2 of the Orders table is stored on server node N1.

Figure 3:
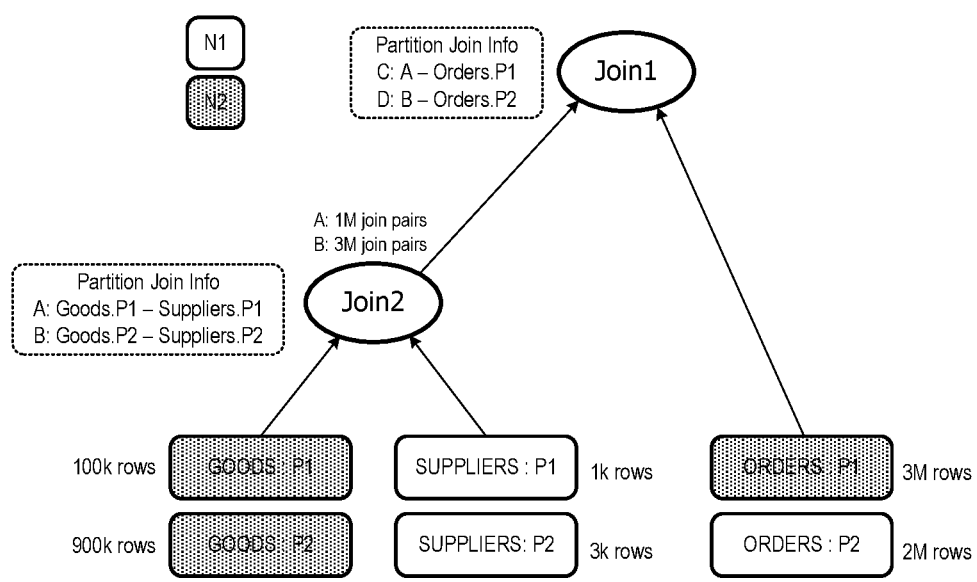
FIG. 3 illustrates execution metadata for a query on partitioned and distributed database table data according to some embodiments.

The compilation server of server node 100 may then determine a location (i.e., a server node) at which to execute each operator represented in tree 200. First, the compilation server determines a number of partition-wise operations corresponding to each of the two join operators. As shown in FIG. 3, the compilation server utilizes metadata and statistics stored in server node 100 to identify partition-wise operations constituting each join operator. In particular, Join2 includes a partition-wise join of partition 1 of the Goods table and partition 1 of the Suppliers table (identified as "A" and the result including 1M join pairs), and a partition-wise join of partition 2 of the Goods table and partition 2 of the Suppliers table (identified as "B" and the result including 3M join pairs). Join1 includes a partition-wise join of the result of A with partition 1 of the Orders table, and a partition-wise join of the result of B with partition 2 of the Orders table.

Figure 4:
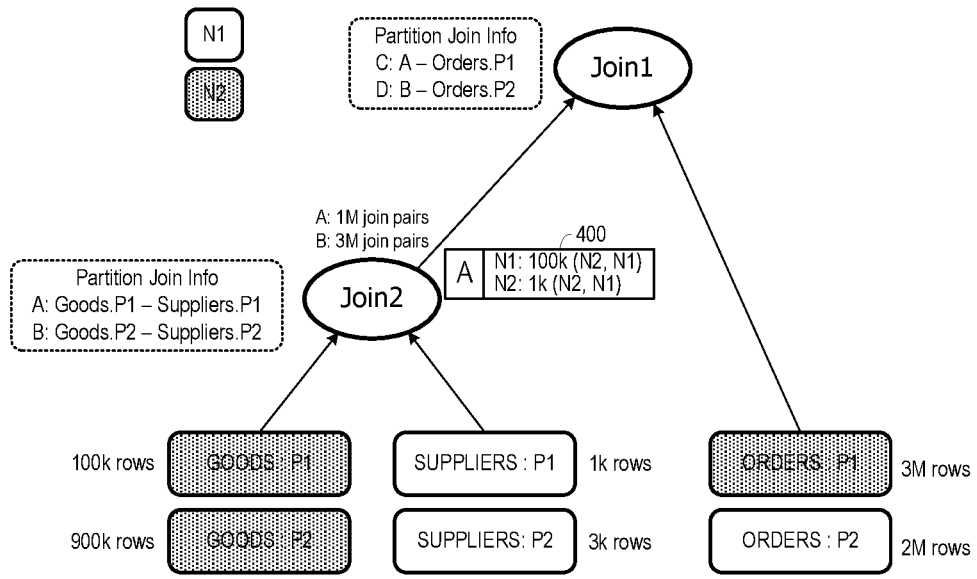
FIG. 4 illustrates determination of execution costs of a first query operator for a query on partitioned and distributed database table data according to some embodiments.

FIG. 4 illustrates the determination of costs of partition-wise operation A according to some embodiments. The cost of executing partition-wise operation A is determined assuming execution on server node N1 (i.e., where partition 1 of the Goods table resides) and is also determined assuming execution on server node N2 (i.e., where partition 1 of the Suppliers table resides). If partition-wise operation A included partitions stored on other server nodes, costs of execution of operation A on those server nodes would be determined as well.

Label 400 indicates that the cost of executing partition-wise operation A on node N1 is 100 k. This 100 k represents the cost of transferring 100 k rows of partition 1 of the Goods table from node N2 to node N1 in order to execute partition-wise operation A with partition 1 of the Suppliers table, which already resides on node N1. The notation (N2, N1) of label 400 further indicates that the determined cost of executing partition-wise operation A on node N1 is based on the left child of partition-wise operation A (i.e., partition 1 of the Goods table) coming from node N2 and the right child of the partition-wise operation (i.e., partition 1 of the Suppliers table) coming from node N1.

Label 400 also indicates that the cost of executing partition-wise operation A on node N2 is 1 k. This 1 k represents the cost of transferring 1 k rows of partition 1 of the Suppliers table from node N1 to node N2 in order to execute partition-wise operation A on node N2 with partition 1 of the Goods table, which already resides on node N2.

Figure 5:
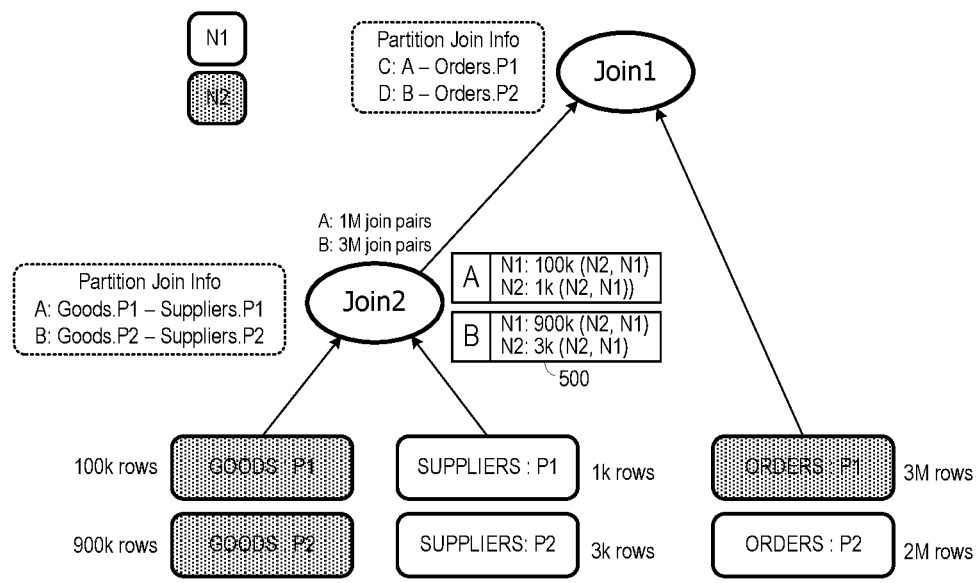
FIG. 5 illustrates determination of execution costs of a second query operator for a query on partitioned and distributed database table data according to some embodiments.

Label 500 of FIG. 5 indicates that the cost of executing partition-wise operation B on node N1 is 900 k, which is the cost of transferring 900 k rows of partition 2 of the Goods table from node N2 to node N1 in order to execute partition-wise operation A with partition 2 of the Suppliers table, which already resides on node N1. Label 500 also indicates that the cost of executing partition-wise operation B on node N2 is 3 k, which represents the cost of transferring 3 k rows of partition 2 of the Suppliers table from node N1 to node N2 in order to execute partition-wise operation B on node N2 with partition 2 of the Goods table, which already resides on node N2.

Figure 6:
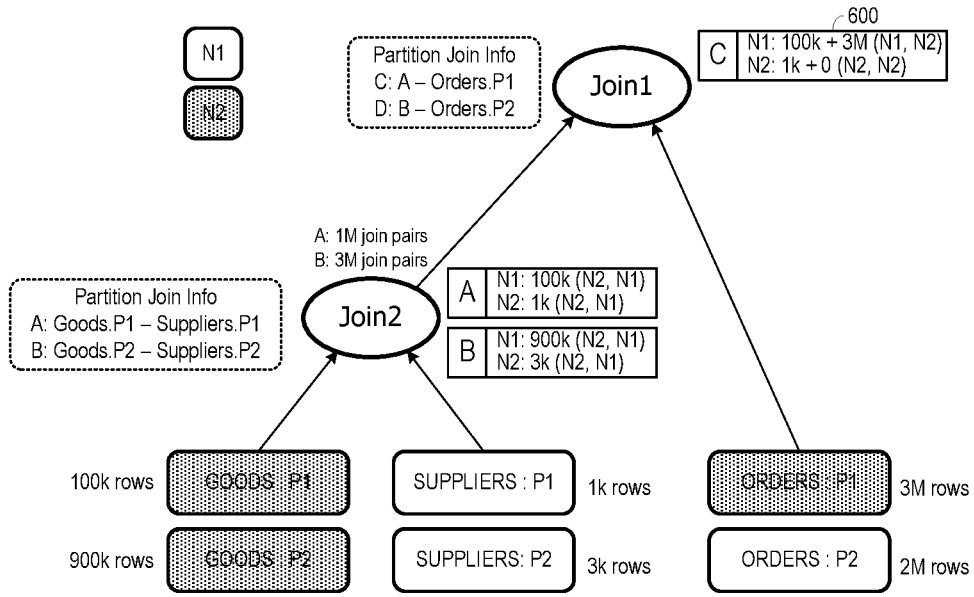
FIG. 6 illustrates determination of execution costs of a third query operator for a query on partitioned and distributed database table data according to some embodiments.
Figure 7:
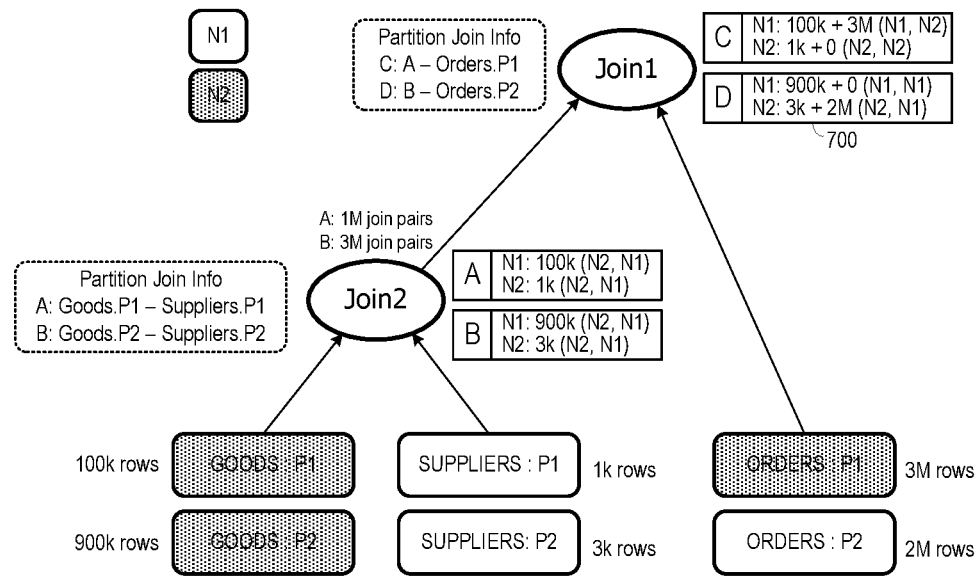
FIG. 7 illustrates determination of execution costs of a fourth query operator for a query on partitioned and distributed database table data according to some embodiments.

FIGS. 6 and 7 illustrate the determination of costs of the partition-wise operations constituting operator Join1 of operator tree 200. Label 600 indicates costs for performing partition-wise operation C on node N1 and node N2, respectively. In order to determine the cost for performing partition-wise operation C on node N1, it is first assumed that partition-wise operation A, which is an input to partition-wise operation C, is executed on node N1. If so, a transfer cost of 100 k is determined to move partition 1 of the Goods table to node N1 for execution of partition-wise operation A thereon. The 1M join pairs resulting from execution of partition-wise operation A are therefore present on node N1 and no additional transfer costs are needed to execution partition-wise operation C on the 1M join pairs at node N1.

It is then assumed that partition-wise operation A is executed on node N2. If so, a transfer cost of 1 k is determined to move partition 1 of the Suppliers table to node N2 for execution of partition-wise operation A thereon. The 1M join pairs resulting from execution of partition-wise operation A will then have to be moved to node N1 for execution of partition-wise operation C on the 1M join pairs at node N1.

Accordingly, the transfer costs associated with the left child of operation C, if operation C is executed on node N1, are 100 k if operation A is performed on node N1 and 1 k+1M if operation A is performed on node N2. Since the right child is located on node N2 and includes 3M rows, the transfer costs associated with the right child are 3M, if operation C is executed on node N1. Label 600 therefore indicates the minimum left child cost (i.e., 100 k) and the associated server node of the left child corresponding to the minimum cost (i.e., node N1), and the minimum right child cost (i.e., 3M) and the associated server node of the right child corresponding to the minimum cost (i.e., node N2).

Next, in order to determine the cost for performing partition-wise operation C on node N2, it is again assumed that partition-wise operation A is executed on node N1. If so, a transfer cost of 100 k is determined to move partition 1 of the Goods table to node N1 for execution of partition-wise operation A thereon. The 1M join pairs resulting from execution of partition-wise operation A are therefore present on node N1 and will have to be moved to node N2 for execution of partition-wise operation C on the 1M join pairs at node N2. The total transfer cost for executing partition-wise operation C on node N2 and partition-wise operation A on node N1 is 100 k+1M.

It is then assumed that partition-wise operation A is executed on node N2. If so, a transfer cost of 1 k is determined to move partition 1 of the Suppliers table to node N2 for execution of partition-wise operation A thereon. Since the 1M join pairs resulting from execution of partition-wise operation A will be located at node N2, no further transfer costs are needed to execute operation C on the 1M join pairs at node N2. The total transfer cost for executing partition-wise operation C on node N2 and partition-wise operation A on node N2 is therefore 1 k.

Since the right child of operation C is located on node N2 and includes 3M rows, the transfer costs associated with the right child are 0 if operation C is executed on node N2. Label 600 therefore also indicates, for the case of executing operation C on node N2, the minimum left child cost (i.e., 1 k) and the associated server node of the left child corresponding to the minimum cost (i.e., node N2), and the minimum right child cost (i.e., 0) and the associated server node of the right child corresponding to the minimum cost (i.e., node N2).

Label 700 indicates costs for performing partition-wise operation D on node N1 and node N2, respectively. To determine the cost for performing partition-wise operation D on node N1, it is first assumed that partition-wise operation B, which is an input to partition-wise operation C, is executed on node N1. If so, a transfer cost of 900 k is determined to move partition 2 of the Goods table to node N1 for execution of partition-wise operation B thereon. The 3M join pairs resulting from execution of partition-wise operation B will then present on node N1 and no additional transfer costs are needed to execution partition-wise operation D on the 3M join pairs at node N1.

It is then assumed that partition-wise operation B is executed on node N2. If so, a transfer cost of 3 k is determined to move partition 2 of the Suppliers table to node N2 for execution of partition-wise operation B thereon. The 3M join pairs resulting from execution of partition-wise operation B will then have to be moved to node N1 for execution of partition-wise operation D on the 3M join pairs at node N1.

The transfer costs associated with the left child of operation D, if operation D is executed on node N1, are therefore 900 k if operation B is performed on node N1 and 3 k+3M if operation B is performed on node N2. The right child of operation D is located on node N1 and includes 2M rows, so the transfer costs associated with the right child are zero if operation D is executed on node N1. Label 700 therefore indicates the minimum left child cost (i.e., 900 k) and the associated server node of the left child corresponding to the minimum cost (i.e., node N1), and the minimum right child cost (i.e., 0) and the associated server node of the right child corresponding to the minimum cost (i.e., node N1).

The cost for performing partition-wise operation D on node N2 is then determined. Again, it is assumed that partition-wise operation B is executed on node N1. If so, a transfer cost of 900 k is determined to move partition 1 of the Suppliers table to node N2 for execution of partition-wise operation B thereon. The 3M join pairs resulting from execution of partition-wise operation A are therefore present on node N1 and will have to be moved to node N2 for execution of partition-wise operation D on the 3M join pairs at node N2. The total transfer cost for executing partition-wise operation D on node N2 and partition-wise operation B on node N1 is 900 k+3M.

It is then assumed that partition-wise operation B is executed on node N2. If so, a transfer cost of 3 k is determined to move partition 1 of the Suppliers table to node N2 for execution of partition-wise operation B thereon. The 3M join pairs resulting from execution of partition-wise operation B will then be located at node N2, so no further transfer costs are needed to execute operation D on the 3M join pairs at node N2. The total transfer cost for executing partition-wise operation D on node N2 and partition-wise operation B on node N2 is therefore 3 k.

Since the right child of operation D is located on node N1 and includes 2M rows, the transfer costs associated with the right child are 2M if operation D is executed on node N2. Label 700 therefore also indicates, for the case of executing operation D on node N2, the minimum left child cost (i.e., 3 k) and the associated server node of the left child corresponding to the minimum cost (i.e., node N2), and the minimum right child cost (i.e., 2M) and the associated server node of the right child corresponding to the minimum cost (i.e., node N1).

Figure 8:
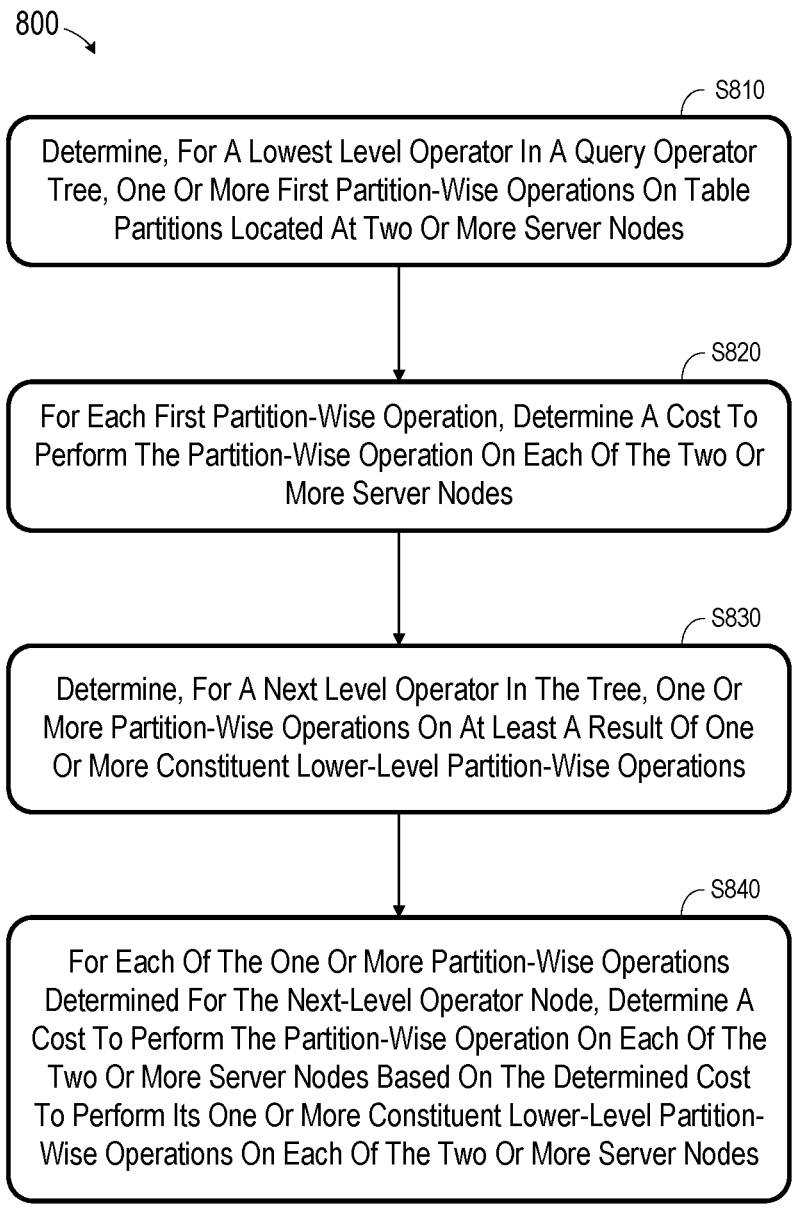
FIG. 8 is a flow diagram to determine execution locations for query operators of a query on partitioned and distributed database table data according to some embodiments.

FIG. 8 comprises a flow diagram of process 800 according to some embodiments. In some embodiments, various hardware elements of server node 100 execute program code to perform process 800. Process 800 and all other processes mentioned herein may be embodied in computer-executable program code read from one or more of non-transitory computer-readable media, such as a hard disk drive, a nolatile or non-volatile random access memory, a DVD-ROM, a Flash drive, and a magnetic tape, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

Process 800 may be applied to an operator tree consisting of any type of operators and any number of hierarchical levels. Embodiments are not limited to join operators, operators have two partitions as input, or one level of operator nesting.

Initially, at S810, and for a lowest level operator in a query operator tree, one or more first partition-wise operations on table partitions located at two or more server nodes are determined. With reference to the above example, partition-wise operations A and B may be determined for lowest level operator Join2 at S810.

At S820, and for each determined first partition-wise operation, a cost to perform the partition-wise operation on each of the two or more server nodes is determined. Continuing with the above example, S820 may include determining a cost to perform partition-wise operation A on server node N1, a cost to perform partition-wise operation A on server node N2, a cost to perform partition-wise operation B on server node N1, a cost to perform partition-wise operation B on server node N2.

Next, at S830, and for a next level operator in the tree, one or more partition-wise operations on at least a result of one or more constituent lower-level partition-wise operations are determined. In one example of S830, partition-wise operations C and D are determined for operator Joint. Each of partition-wise operations C and D are operations on a result of at least one lower-level partition-wise operation (i.e., operation A in the case of operation C, and operation B in the case of operation D).

For each partition-wise operation determined at S830, a cost to perform the partition-wise operation on each of the two or more server nodes is determined at S840. The determination is based on the cost of performing the partition-wise operation's one or more constituent lower-level partition-wise operations on each of the two or more server nodes. For example, costs to perform partition-wise operation C on each of nodes N1 and N2 are determined at S840. As described with respect to FIG. 6, the determination of the costs is based on the cost of performing operation A on each of the two or more server nodes.

Figure 9:
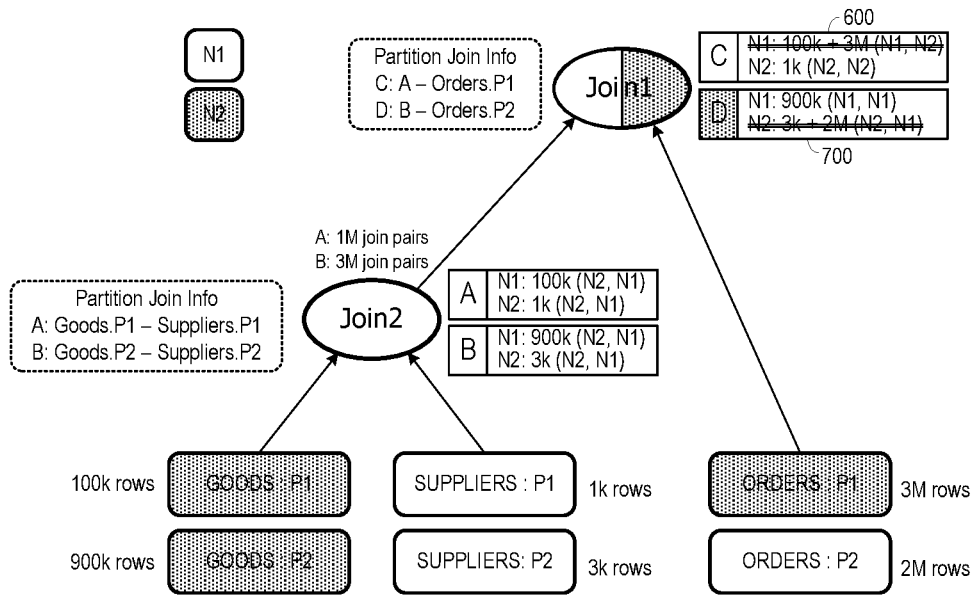
FIG. 9 illustrates determination of execution locations of a third query operator and a fourth query operator for a query on partitioned and distributed database table data according to some embodiments.
Figure 10:
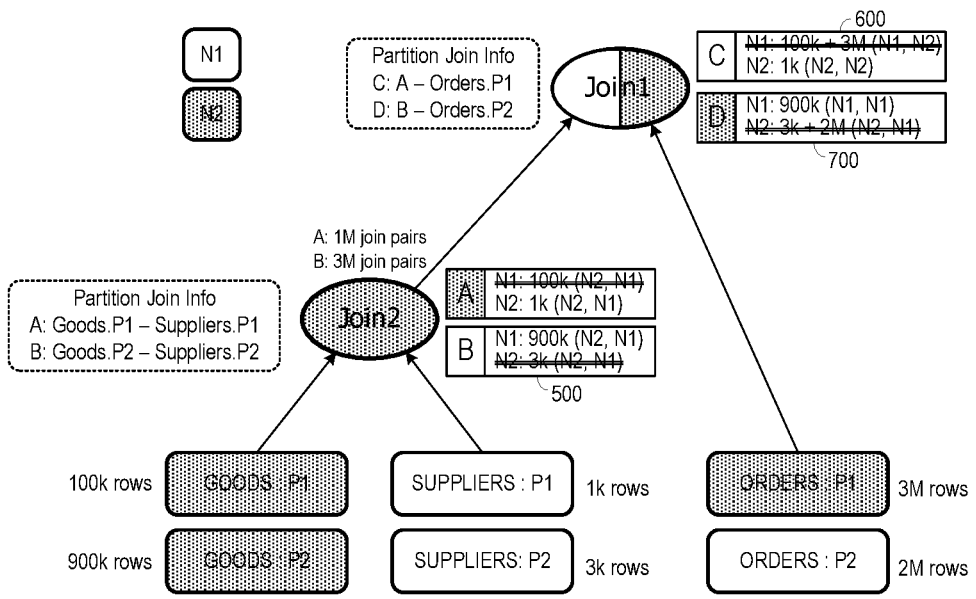
FIG. 10 illustrates determination of execution locations of a first query operator and a second query operator for a query on partitioned and distributed database table data according to some embodiments.

FIGS. 9 and 10 illustrate determination of a location to execute each partition-wise operation according to some embodiments. The determination is based on the costs determined as described above and proceeds from upper to lower operators of the operator tree. As illustrated in FIG. 9, and based on the difference in associated costs (1 k vs. 100 k+3M), it is determined to execute partition-wise operation C at node N2 instead of at node N1, with the left and right child of the operation both coming from server node N2. Similarly, it is determined to execute partition-wise operation D at node N1, with the left and right child of the operation both coming from server node N1.

FIG. 10 illustrates execution locations of operations A and B, in view of the left and right child locations specified in labels 600 and 700. As shown, operation A is determined to be executed at server node N2 in view of the left child location of operation C mentioned above. Operation B is determined to be executed at server node N1 in view of the left child location of operation D mentioned above. Execution of operation B at server node N1 is counter-intuitive if label 500 is seen in isolation, since execution of operation B at node N2 is associated with a lower transfer cost (i.e., 3 k) than execution of operation B at node N1 (i.e., 900 k). However, execution of operation B at node N2 result in an overall lower transfer cost for operations B and D.

Figure 11:
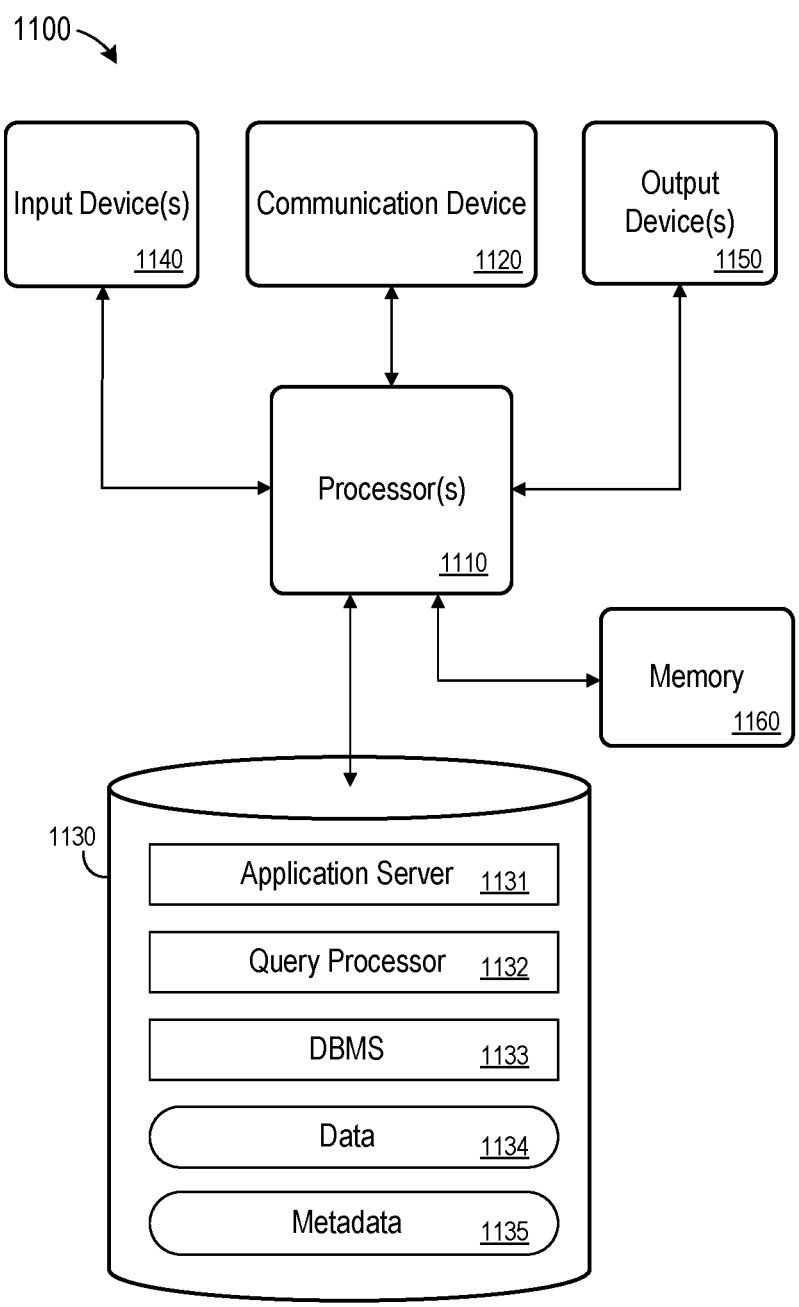
FIG. 11 is a block diagram of a database node according to some embodiments.

FIG. 11 is a block diagram of server node 1100 according to some embodiments. Server node 1100 may comprise a general-purpose computing apparatus and may execute program code to perform any of the functions described herein. Server node 1100 may comprise an implementation of server node 100 in some embodiments. Server node 1100 may include other unshown elements according to some embodiments.

Server node 1100 includes processor(s) 1110 operatively coupled to communication device 1120, data storage device 1130, one or more input devices 1140, one or more output devices 1150 and memory 1160. Communication device 1120 may facilitate communication with external devices, such as a reporting client, or a data storage device. Input device(s) 1140 may comprise, for example, a keyboard, a keypad, a mouse or other pointing device, a microphone, knob or a switch, an infra-red (IR) port, a docking station, and/or a touch screen. Input device(s) 1140 may be used, for example, to enter information into apparatus 1100. Output device(s) 1150 may comprise, for example, a display (e.g., a display screen) a speaker, and/or a printer.

Data storage device 1130 may comprise any appropriate persistent storage device, including combinations of magnetic storage devices (e.g., magnetic tape, hard disk drives and flash memory), optical storage devices, Read Only Memory (ROM) devices, etc., while memory 1160 may comprise Random Access Memory (RAM).

Application server 1131 and query processor 1132 may each comprise program code executed by processor(s) 1110 to cause server 1100 to perform any one or more of the processes described herein. Embodiments are not limited to execution of these processes by a single computing device.

Data 1134 may include conventional partitioned database data as described above. As also described above, database data (either cached or a full database) may be stored in volatile memory such as volatile memory 1160. Data storage device 1130 may also store data and other program code for providing additional functionality and/or which are necessary for operation of server 1100, such as device drivers, operating system files, etc.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation some embodiments may include a processor to execute program code such that the computing device operates as described herein.

Embodiments described herein are solely for the purpose of illustration. Those in the art will recognize other embodiments may be practiced with modifications and alterations to that described above.

What is claimed is:

1. A system comprising:
a memory storing processor-executable program code; and
a processor to execute the processor-executable program code in order to cause the system to:
determine, starting at a lowest level of a query operator tree representation of a received query, a first partition-wise operation on a first database table partition of a first table located at a first server node and a first database table partition of a second table located at a second server node;
determine a first cost to execute the first partition-wise operation on the first server node, and a second cost to execute the first partition-wise operation on the second server node;
determine, at a next higher level of the query operator tree, a second partition-wise operation on a result of the first partition-wise operation;
determine a third cost to execute the second partition-wise operation on the first server node based on the first cost and the second cost, and a fourth cost to execute the second partition-wise operation on the second server node based on the first cost and the second cost;
determine, starting at the level of the query operator tree for which the third cost was determined, between one of the first server node and the second server-node, a location to execute the second partition-wise operation based on the third cost and the fourth cost; and
determine, at a next lower level of the query operator tree, between one of the first server node and the second server node, a location to execute the first partition-wise operation based on the third cost, the fourth cost, child locations of the second partition-wise operation to determine the third cost, and child locations of the second partition-wise operation to determine the fourth cost to obtain the locations to execute the second partition-wise operation and to execute the first partition-wise operation having an overall lowest total cost.

2. A system according to claim 1, wherein the second partition-wise operation is an operation on a result of the first partition-wise operation and a first partition of a third table.

3. A system according to claim 1, the processor to execute the processor-executable program code in order to cause the system to:
determine a third partition-wise operation on a second database table partition of the first table located at the first server node and a second database table partition of the second table located at the second server node;
determine a fifth cost to execute the third partition-wise operation on the first server node, and a sixth cost to execute the third partition-wise operation on the second server node;
determine a fourth partition-wise operation on a result of the third partition-wise operation;
determine a seventh cost to execute the fourth partition-wise operation on the first server node based on the fifth cost and the sixth cost, and an eighth cost to execute the fourth partition-wise operation on the second server node based on the fifth cost and the sixth cost;
determine, between one of the first server node and the second server node, a location to execute the fourth partition-wise operation based on the seventh cost and the eighth cost; and
determine, between one of the first server node and the second server node, a location to execute the third partition-wise operation based on the seventh cost, the eighth cost, child locations of the fourth partition-wise operation to determine the seventh cost, and child locations of the fourth partition-wise operation to determine the eight cost to obtain the locations to execute the fourth partition-wise operation and to execute the third partition-wise operation having an overall lowest total cost.

4. A system according to claim 3, wherein the second partition-wise operation is an operation on a result of the first partition-wise operation and a first partition of a third table, and
wherein the fourth partition-wise operation is an operation on a result of the third partition-wise operation and a second partition of the third table.

5. A system according to claim 1, wherein determination of the third cost and determination of the fourth cost are based on a number of rows in a result of the first partition-wise operation, and
wherein determination of the seventh cost and determination of the eighth cost are based on a number of rows in a result of the third partition-wise operation.

6. A system according to claim 1, wherein determination of the third cost and determination of the fourth cost are based on a number of rows in a result of the first partition-wise operation.

7. A computer-implemented method, comprising:
determining, starting at a lowest level of a query operator tree representation of a received query, a first partition-wise operation on a first database table partition of a first table located at a first server node and a first database table partition of a second table located at a second server node;
determining, at a next higher level of the query operator tree, a first cost to execute the first partition-wise operation on the first server node, and a second cost to execute the first partition-wise operation on the second server node;
determining a second partition-wise operation on a result of the first partition-wise operation;
determining a third cost to execute the second partition-wise operation on the first server node based on the first cost and the second cost, and a fourth cost to execute the second partition-wise operation on the second server node based on the first cost and the second cost;
determining, starting at the level of the query operator tree for which the third cost was determined, between one of the first server node and the second server node, a location to execute the second partition-wise operation based on the third cost and the fourth cost; and
determining, at a next lower level of the query operator tree, between one of the first server node and the second server node, a location to execute the first partition-wise operation based on the third cost, the fourth cost, child locations of the second partition-wise operation to determine the third cost, and child locations of the second partition-wise operation to determine the fourth cost to obtain the locations to execute the second partition-wise operation and to execute the first partition-wise operation having an overall lowest total cost.

8. A method according to claim 7, wherein the second partition-wise operation is an operation on a result of the first partition-wise operation and a first partition of a third table.

9. A method according to claim 6, further comprising:
determining a third partition-wise operation on a second database table partition of the first table located at the first server node and a second database table partition of the second table located at the second server node;
determining a fifth cost to execute the third partition-wise operation on the first server node, and a sixth cost to execute the third partition-wise operation on the second server node;
determining a fourth partition-wise operation on a result of the third partition-wise operation;
determining a seventh cost to execute the fourth partition-wise operation on the first server node based on the fifth cost and the sixth cost, and an eighth cost to execute the fourth partition-wise operation on the second server node based on the fifth cost and the sixth cost;
determining, between one of the first server node and the second server node, a location to execute the fourth partition-wise operation based on the seventh cost and the eighth cost; and
determining, between one of the first server node and the second server node, a location to execute the third partition-wise operation based on the seventh cost, the eighth cost, child locations of the fourth partition-wise operation to determine the seventh cost, and child locations of the fourth partition-wise operation to determine the eight cost to obtain the locations to execute the fourth partition-wise operation and to execute the third partition-wise operation having an overall lowest total cost.

10. A method according to claim 9, wherein the second partition-wise operation is an operation on a result of the first partition-wise operation and a first partition of a third table, and
wherein the fourth partition-wise operation is an operation on a result of the third partition-wise operation and a second partition of the third table.

11. A method according to claim 7, wherein determining the third cost and determining the fourth cost are based on a number of rows in a result of the first partition-wise operation, and
wherein determining the seventh cost and determining the eighth cost are based on a number of rows in a result of the third partition-wise operation.

12. A method according to claim 1, wherein determining the third cost and determination of the fourth cost are based on a number of rows in a result of the first partition-wise operation.

13. A database node comprising:
a compilation server to:
determine, starting at a lowest level of a query operator tree representation of a received query, a first partition-wise operation on a first database table partition of a first table located at a first server node and a first database table partition of a second table located at a second server node;
determine a first cost to execute the first partition-wise operation on the first server node, and a second cost to execute the first partition-wise operation on the second server node;
determine, at a next higher level of the query operator tree, a second partition-wise operation on a result of the first partition-wise operation;
determine a third cost to execute the second partition-wise operation on the first server node based on the first cost and the second cost, and a fourth cost to execute the second partition-wise operation on the second server node based on the first cost and the second cost;
determine, starting at the level of the query operator tree for which the third cost was determined, between one of the first server node and the second server node, a location to execute the second partition-wise operation based on the third cost and the fourth cost; and
determine, at a next lower level of the query operator tree, between one of the first server node and the second server node a location to execute the first partition-wise operation based on the third cost, the fourth cost, child locations of the second partition-wise operation to determine the third cost, and child locations of the second partition-wise operation to determine the fourth cost to obtain the locations to execute the second partition-wise operation and to execute the first partition-wise operation having an overall lowest total cost.

14. A database node according to claim 13, wherein the second partition-wise operation is an operation on a result of the first partition-wise operation and a first partition of a third table.

15. A database node according to claim 13, the compile server to:
determine a third partition-wise operation on a second database table partition of the first table located at the first server node and a second database table partition of the second table located at the second server node;
determine a fifth cost to execute the third partition-wise operation on the first server node, and a sixth cost to execute the third partition-wise operation on the second server node;
determine a fourth partition-wise operation on a result of the third partition-wise operation;
determine a seventh cost to execute the fourth partition-wise operation on the first server node based on the fifth cost and the sixth cost, and an eighth cost to execute the fourth partition-wise operation on the second server node based on the fifth cost and the sixth cost;
determine, between one of the first server node and the second server node, a location to execute the fourth partition-wise operation based on the seventh cost and the eighth cost; and
determine, between one of the first server node and the second server node, a location to execute the third partition-wise operation based on the seventh cost, the eighth cost, child locations of the fourth partition-wise operation to determine the seventh cost, and child locations of the fourth partition-wise operation to determine the eight cost to obtain the locations to execute the fourth partition-wise operation and to execute the third partition-wise operation having an overall lowest total cost.

16. A database node according to claim 15, wherein the second partition-wise operation is an operation on a result of the first partition-wise operation and a first partition of a third table, and
wherein the fourth partition-wise operation is an operation on a result of the third partition-wise operation and a second partition of the third table.

17. A database node according to claim 13, wherein determination of the third cost and determination of the fourth cost are based on a number of rows in a result of the first partition-wise operation, and
wherein determination of the seventh cost and determination of the eighth cost are based on a number of rows in a result of the third partition-wise operation.

18. A database node according to claim 13, wherein determination of the third cost and determination of the fourth cost are based on a number of rows in a result of the first partition-wise operation.

* * * * *